(12) United States Patent
Yamada et al.

(10) Patent No.: US 8,981,080 B2
(45) Date of Patent: Mar. 17, 2015

(54) SILANE-MODIFIED CATIONIZED POLYMERIC COMPOUND AND PROCESS FOR PRODUCTION THEREOF

(75) Inventors: Takeshi Yamada, Ichikawa (JP); Youichirou Kohno, Chiba (JP); Yoko Osako, Tokyo (JP); Yoshifumi Yamagata, Kamagaya (JP)

(73) Assignee: LION Corporation (JP)

( * ) Notice: Subject to any disclaimer, the term of this patent is extended or adjusted under 35 U.S.C. 154(b) by 695 days.

(21) Appl. No.: 13/320,787

(22) PCT Filed: May 18, 2010

(86) PCT No.: PCT/JP2010/003352
§ 371 (c)(1),
(2), (4) Date: Nov. 16, 2011

(87) PCT Pub. No.: WO2010/140309
PCT Pub. Date: Dec. 9, 2010

(65) Prior Publication Data
US 2012/0065388 A1    Mar. 15, 2012

(30) Foreign Application Priority Data
Jun. 4, 2009 (JP) ................................. 2009-134908

(51) Int. Cl.
| C08B 15/06 | (2006.01) |
| D21C 3/00 | (2006.01) |
| D21C 3/22 | (2006.01) |
| C08B 15/00 | (2006.01) |

(52) U.S. Cl.
CPC ...................................... *C08B 15/06* (2013.01)
USPC ........ 536/124; 536/56; 162/157.1; 162/157.6

(58) Field of Classification Search
CPC ............. D21C 3/00; D21C 3/22; C08B 15/00
USPC ....................... 536/124, 56; 162/157.1, 157.6
See application file for complete search history.

(56) References Cited

U.S. PATENT DOCUMENTS 4,540,777 A * 9/1985 Amort et al. .................. 536/102

FOREIGN PATENT DOCUMENTS

| JP | B-51-002103 | 1/1976 |
| JP | A-2007-084680 | 4/2007 |
| JP | A-2007-211167 | 8/2007 |
| WO | WO 2009/025354 A1 | 2/2009 |

OTHER PUBLICATIONS

International Search Report for International Patent Application No. PCT/JP2010/003352 (Jun. 22, 2010) with English translation.

* cited by examiner

*Primary Examiner* — Patrick Lewis
*Assistant Examiner* — Everett White
(74) *Attorney, Agent, or Firm* — Merchant & Gould P.C.

(57) ABSTRACT

A process for producing a silane-modified cationized polymeric compound, the process including the steps of: (1) cationizing a water-soluble polymeric compound in a mixed solvent of a water-miscible organic solvent and water in the presence of an alkali to produce a slurry containing a cationized polymeric compound, (2) adding an aminosilane compound to the slurry or a cake produced therefrom, thereby treating the cationized polymeric compound with the aminosilane compound, (3) optionally adding an acid to the slurry obtained in step (1) or a product obtained in step (2), and (4) drying a product obtained in step (2) or a product obtained by performing step (3) after step (2), wherein the drying step (4) includes a primary drying treatment step of performing drying at a temperature of 50 to 140° C. under a degree of vacuum of 4.0 to 53.3 kPa, and a secondary drying treatment step of drying the product obtained following the primary drying treatment at a temperature of 90 to 155° C. The process enables a silane-modified cationized polymeric compound having excellent water dispersibility to be produced with good efficiency.

7 Claims, No Drawings

SILANE-MODIFIED CATIONIZED POLYMERIC COMPOUND AND PROCESS FOR PRODUCTION THEREOF

This application is a U.S. National Stage Application under 35 U.S.C. §371 of International Patent Application no. PCT/JP2010/003352, filed 18 May 2010, which claims the benefit of priority to Japanese Patent Application No. 2009-134908, filed 4 Jun. 2009, the disclosures of all of which are hereby incorporated by reference in their entireties. The International application was published in Japanese on 9 Dec. 2010 as WO 2010/140309.

TECHNICAL FIELD

The present invention relates to a silane-modified cationized polymeric compound prepared by treating a cationized polymeric compound with an aminosilane compound, and also relates to a process for producing the silane-modified cationized polymeric compound.

BACKGROUND

Cationized polymeric compounds such as cationized cellulose exhibit hydrophilicity and thickening properties, and are therefore widely used in a variety of fields as thickeners, adhesives, dispersants and emulsion stabilizers and the like.

In these applications, the cationized polymeric compound is typically dissolved in water or a mixed solvent containing water (hereinafter also referred to as an "aqueous solvent") prior to use, and is therefore usually in a powdered form or fine particulate form to aid dissolution.

However, because these types of cationized polymeric compounds generally exhibit extremely high levels of solubility in water and aqueous solvents, if the compound is simply added to the water or aqueous solvent, then only the surface of each particle is wet by the water and dissolved, and the particles then bond together in clusters, forming undissolved lumps. Once these undissolved lumps form, the contact surface area between the cationized polymeric compound and the water is reduced dramatically, and achieving complete dissolution of the cationized polymeric compound takes considerable time, which can be problematic in an industrial process.

In response to this problem, a glyoxal treatment is known in which a water-soluble polymeric compound such as a cationized cellulose is treated with glyoxal, thereby enhancing the hydrophobicity and improving the dispersibility of the polymeric compound within water (hereinafter referred to as "water dispersibility") (for example, see Patent Document 1). According to this glyoxal treatment, the glyoxal reacts with the hydroxyl groups of the water-soluble polymeric compound, resulting in cross-linking between the glyoxal and the water-soluble polymeric compound via hemiacetal bonds. This cross-linking hydrolyzes upon treatment with an alkali or heat, and therefore the glyoxal-treated water-soluble polymeric compound disperses with excellent water dispersibility when added to water or an aqueous solvent, and can subsequently be subjected to treatment with an alkali or heat to achieve excellent dissolution.

However, glyoxal has been identified as a mutagenic substance, and therefore an alternative technology to this glyoxal treatment is required.

Silane modification treatment in which a cationized polymeric compound is treated with an aminosilane-based compound has been proposed as an alternative to the glyoxal treatment (see Patent Documents 2 and 3). This treatment improves the water dispersibility by hydrophobization of the particle surface of the cationized polymeric compound. As a result, the formation of undissolved lumps is suppressed, and the water solubility is improved. The processes disclosed in the above patent documents specifically include cationizing a water-soluble polymeric compound under strong alkaline conditions, performing a neutralization, and then reacting the obtained cationized polymeric compound with an aminosilane-based compound in the presence of an organic solvent such as a lower alcohol, thus producing a silane-modified cationized polymeric compound.

PATENT DOCUMENTS

Patent Document 1:
 Japanese Unexamined Patent Application, First Publication No. 2007-084680
Patent Document 2:
 Japanese Unexamined Patent Application, First Publication No. 2007-211167
Patent Document 3:
 International Patent Publication No. 2009/025354 pamphlet

DETAILED DESCRIPTION

Problems to be Solved by the Invention

The silane-modified cationized polymeric compounds produced using the production processes disclosed in the above Patent Documents 1 and 2 exhibit good water dispersibility similar to that of glyoxal-treated polymeric compounds.

However, according to investigations conducted by the inventors of the present invention, silane-modified cationized polymeric compound powders obtained using the production processes described above tend to retain some of the organic solvent used in the production, which cannot be satisfactorily removed even if a drying treatment is performed. This issue requires improvement in terms of the odor and environmental considerations during handling.

Possible methods of better removing the organic solvent include increasing the temperature or lengthening the drying time. However, even if the drying temperature is increased, reducing the amount of residual organic solvent is difficult, and other problems can also arise, including deterioration in the water dispersibility, solubility and coloring of the obtained silane-modified cationized polymeric compound. Further, lengthening the drying time is undesirable from a production efficiency perspective, and even if the drying time is lengthened, satisfactorily reducing the amount of residual organic solvent in an industrially practical period of time is problematic.

Moreover, investigations conducted by the inventors of the present invention also suggest that the production processes described do not offer very good production efficiency. For example, in order to achieve a similar level of water dispersibility to the above-mentioned glyoxal treatment using one of the above-mentioned silane modification treatments, the aminosilane compound must be used in a much larger amount than the glyoxal.

The present invention has been developed in light of the above circumstances, and has an object of providing a process for efficiently producing a silane-modified cationized polymeric compound powder that exhibits excellent water dispersibility, wherein the process enables the amount of residual organic solvent to be reduced with a short drying treatment, as well as providing a silane-modified cationized polymeric compound containing a reduced amount of residual organic solvent and having excellent water dispersibility.

Means to Solve the Problems

As a result of intensive investigation, the inventors of the present invention discovered that by performing a two-stage drying treatment under specific conditions, the amount of residual organic solvent could be reduced via a short drying treatment. The inventors also discovered that by setting the pH within a specific alkaline region during treatment of a cationized polymeric compound with an aminosilane compound, and ensuring that the amount of the aminosilane compound satisfied a specific range, a silane-modified cationized polymeric compound having excellent water dispersibility could be produced with good efficiency.

In order to achieve the object described above, the present invention provides:

<1> A process for producing a silane-modified cationized polymeric compound, the process including:
  a step (1) of cationizing a water-soluble polymeric compound, in a mixed solvent of a water-miscible organic solvent and water, and in the presence of an alkali, thus forming a slurry containing a cationized polymeric compound,
  a step (2) of adding an aminosilane compound to the slurry or a cake produced therefrom, thus treating the cationized polymeric compound with the aminosilane compound,
  an optional step (3) of adding an acid to the slurry obtained in step (1) or the product obtained in step (2), and
  a step (4) of drying the product obtained in step (2) or the product obtained by performing step (3) after step (2), wherein
  the drying of step (4) includes:
  a primary drying treatment step of performing drying at a temperature of 50 to 140° C. under a degree of vacuum of 4.0 to 53.3 kPa, and
  a secondary drying treatment step of drying the product following the primary drying treatment at a temperature of 90 to 155° C.

Further, the present invention also provides: <2> the process for producing a silane-modified cationized polymeric compound according to <1>, wherein the amount added of the aminosilane compound during step (2) is within a range from 0.05 to 20% by mass relative to the amount of the water-soluble polymeric compound, and the treatment of the cationized polymeric compound with the aminosilane compound is performed under alkaline conditions with a pH of 10 or greater.

Furthermore, the present invention also provides: <3> the process for producing a silane-modified cationized polymeric compound according to <1> or <2>, wherein the primary drying treatment step of step (4) is performed at a degree of vacuum of 4.0 to 20.0 kPa for a temperature of at least 50° C. but less than 70° C., at a degree of vacuum of 10.0 to 53.3 kPa for a temperature of at least 70° C. but less than 110° C., and at a degree of vacuum of 13.3 to 53.3 kPa for a temperature of at least 110° C. but not more than 140° C.

Moreover, the present invention also provides:
<4> A process for producing a silane-modified cationized polymeric compound, the process including:
  a step (1) of cationizing a water-soluble polymeric compound, in a mixed solvent of a water-miscible organic solvent and water, and in the presence of an alkali, thus forming a slurry containing a cationized polymeric compound,
  a step (2) of adding an aminosilane compound to the slurry or a cake produced therefrom, thus treating the cationized polymeric compound with the aminosilane compound, and
  a step (4) of drying the product obtained in step (2), wherein
  the amount added of the aminosilane compound during step (2) is within a range from 0.05 to 20% by mass relative to the amount of the water-soluble polymeric compound, the treatment of the cationized polymeric compound with the aminosilane compound is performed under alkaline conditions with a pH of 10 or greater, and
  step (4) includes:
    performing a primary drying treatment of the product at a temperature of 50 to 120° C. under a degree of vacuum of 13.4 to 53.3 kPa, and
    performing a secondary drying treatment of the product following the primary drying treatment at a temperature of 90 to 150° C. under a degree of vacuum of not more than 13.3 kPa.

Further, the present invention also provides: <5> the process for producing a silane-modified cationized polymeric compound according to <4>, further including a step (3) of adding an acid to the product obtained in step (2).

Furthermore, the present invention also provides: <6> the process for producing a silane-modified cationized polymeric compound according to any one of <1> to <5>, wherein the primary drying treatment step is performed until the amount of residual organic solvent is 0.20% by mass or less.

Further, the present invention also provides: <7> the process for producing a silane-modified cationized polymeric compound according to any one of <1> to <6>, wherein the secondary drying treatment step is performed until the loss on drying is 2% by mass or less.

Furthermore, the present invention also provides: <8> the process for producing a silane-modified cationized polymeric compound according to any one of <1> to <5>, wherein the cationized polymeric compound is a cationized cellulose.

Moreover, the present invention also provides:
<9> A silane-modified cationized polymeric compound, wherein the residual amount of the water-miscible organic solvent used during cationization is less than 0.10% by mass, and the dispersion time within water is not more than 60 seconds.

Further, the present invention also provides: <10> the silane-modified cationized polymeric compound according to <9>, wherein the loss on drying is 2% by mass or less.

Furthermore, the present invention also provides: <11> the silane-modified cationized polymeric compound according to <9> or <10>, wherein the amount of adsorption of the aminosilane compound is within a range from 0.03 to 10%.

Moreover, the present invention also provides: <12> the silane-modified cationized polymeric compound according to any one of <9> to <11>, wherein the cationized polymeric compound is a cationized cellulose.

Effect of the Invention

According to the present invention, a silane-modified cationized polymeric compound having excellent water dispersibility can be produced efficiently, with the amount of residual organic solvent being reduced with a short drying treatment.

BEST MODE FOR CARRYING OUT THE INVENTION

A production process of the present invention includes step (1), step (2) and step (4) described below, and may also include an optional step (3).

A step (1) of cationizing a water-soluble polymeric compound, in a mixed solvent of a water-miscible organic solvent and water, and in the presence of an alkali, thus forming a slurry containing a cationized polymeric compound.

A step (2) of adding an aminosilane compound to the slurry or a cake produced therefrom, thus treating the cationized polymeric compound with the aminosilane compound.

A step (3) of adding an acid to the slurry obtained in step (1) or the product obtained in step (2).

A step (4) of drying the product obtained in step (2) or step (3).

The production process of the present invention may also include other optional steps besides the steps described above. One example of a preferred other optional step is a step of performing a water-miscible organic solvent addition treatment, prior to step (2) and either following step (1) or following step (3) performed after step (1), thereby reducing the water content within the solvent during treatment with the aminosilane compound in step (2).

The production process of the present invention is preferably conducted using either sequence A or B shown below.

A. Step (1)→Step (2)→Step (4)
B. Step (1)→Step (3)→Step (2)→Step (4)

Moreover, in sequence A, it is preferable that step (3) is performed following step (2), whereas in sequence B, it is preferable that a water-miscible organic solvent addition treatment is performed following step (3). Further, in sequence B, a second step (3) may be performed between step (2) and step (4).

In terms of achieving favorable water dispersibility and solubility with a minimal amount of the aminosilane compound added in step (2), the production process is preferably conducted in accordance with the above-mentioned sequence A.

A detailed description of each of the steps is presented below.

[Step (1)]

In this step, a water-soluble polymeric compound is cationized, in a mixed solvent of a water-miscible organic solvent and water, and in the presence of an alkali, thus forming a slurry containing a cationized polymeric compound.

There are no particular limitations on the cationized polymeric compound, which may be selected appropriately from among conventional compounds. Specific examples include cationized cellulose, cationized starch, cationized guar gum, cationized locust bean gum, cationized tara gum, cationized collagen, cationized hydrolyzed keratin, and cationized hydrolyzed silk. Of these, in terms of yielding superior usability for the present invention, and in terms of industrial usability and the like, cationized cellulose, cationized starch, cationized guar gum or cationized locust bean gum is preferred, and cationized cellulose is particularly desirable.

There are no particular limitations on the degree of cationization of the cationized polymeric compound, and the degree of cationization may be selected in accordance with the intended use of the powder of the silane-modified cationized polymeric compound powder that is obtained as the final product. The degree of cationization is preferably within a range from 0.3 to 2.5% by mass, and more preferably from 0.5 to 2.0% by mass. Provided the degree of cationization is at least 0.3% by mass, the cationicity of the cationized polymeric compound, and therefore the cationicity of the silane-modified cationized polymeric compound, is improved, resulting in improved functionality (such as the thickening properties). Provided the degree of cationization is not more than 2.5% by mass, the adsorption or reactivity between the cationized polymeric compound and the aminosilane compound is favorable, and the water dispersibility of the resulting silane-modified cationized polymeric compound also improves. The degree of cationization of the cationized polymeric compound can be adjusted by altering the amount of the cationization agent used during preparation of the cationized polymeric compound.

The degree of cationization of the cationized polymeric compound can be measured using conventional measurement methods. For example, the degree of cationization of a cationized cellulose describes the ratio of nitrogen atoms per glucose residue unit within the cationized cellulose, and can be measured using the method disclosed in the Japanese Standards of Quasi-drug Ingredients 2006 (published by Yakuji Nippo Ltd.) on the page relating to O-[2-hydroxy-3-(trimethylammonio)propyl]hydroxyethyl cellulose chloride. The nitrogen atoms are derived from the cationization agent.

The mixed solvent used in this step is a mixture of a water-miscible organic solvent and water.

A "water-miscible organic solvent" describes an organic solvent which, when mixed with water in a 1:1 mass ratio at a temperature of 30° C., yields a uniform solution.

Any organic solvent which satisfies the above definition may be used as the water-miscible organic solvent, and examples include alcohols of 1 to 4 carbon atoms and acetone. Of these, alcohols of 1 to 4 carbon atoms are preferred. Specific examples of such alcohols include methanol, ethanol, isopropanol, n-propanol and t-butanol. Among these, ethanol, isopropanol, and t-butanol are preferred from the viewpoints of cost and safety.

From the viewpoints of suppressing side reactions while enabling the cationization reaction to proceed efficiently, the proportion of water within the mixed solvent is preferably within a range from 12 to 30% by mass, and more preferably from 12 to 20% by mass. Ensuring that the proportion of water is at least as large as the lower limit of the above range enables the cationization reaction to proceed more efficiently. If the proportion of water exceeds the upper limit, then gelling may occur due to dissolution of the produced cationized polymeric compound and the water-soluble polymeric compound in the water, resulting in a deterioration in the yield, the handling properties and the productivity.

Examples of the alkali include alkali metal hydroxides such as sodium hydroxide, potassium hydroxide and lithium hydroxide. Of these, sodium hydroxide is the least expensive, and is consequently preferred.

The water-soluble polymeric compound preferably has a viscosity at 20° C. for a 2% by mass aqueous solution of the polymeric compound of 5 to 35,000 mPa·s. This viscosity refers to the viscosity one minute after commencing measurement with a B-type viscometer.

The variety of the water-soluble polymeric compound may be selected in accordance with the target cationized polymeric compound. For example, if the cationized polymeric compound is a cationized cellulose, then a water-soluble cellulose ether can be used favorably as the water-soluble polymeric compound.

Examples of the water-soluble cellulose ether include hydroxyalkyl cellulose ethers.

Hydroxyalkyl cellulose ethers are compounds in which hydroxyalkyl groups are bonded as substituents to the hydroxyl groups of cellulose. These hydroxyalkyl groups are groups represented by the general formula -(A-O)$_n$H. In this formula, A represents an alkylene group of 2 to 3 carbon atoms, is preferably an ethylene group or propylene group, and is most preferably an ethylene group. n represents the average number of mols of the added alkylene oxide, and this average number of added mols is preferably within a range from 0.5 to 3.5 mols, and more preferably from 1 to 2.5 mols, per 1 mol of glucose residues (unit structures) within the water-soluble cellulose ether.

Cellulose ethers such as hydroxyalkyl cellulose ethers are commonly referred to as cellulose within the technical field. This also applies in this specification, and cellulose ethers may sometimes be referred to as simply "cellulose". Accordingly, the terms "hydroxyalkyl cellulose ether" and "hydroxyalkyl cellulose" describe the same compounds.

The hydroxyalkyl cellulose ether may have other substituents besides the hydroxyalkyl groups. Examples of these other substituents include alkyl groups of 1 to 3 carbon atoms.

Specific examples of hydroxyalkyl cellulose ethers include hydroxyethyl cellulose (HEC), hydroxypropyl cellulose (HPC), methyl hydroxyethyl cellulose (MHEC), methyl hydroxypropyl cellulose (MHPC), and ethyl hydroxyethyl cellulose (EHEC). Of these, HEC is inexpensive and commonly used in applications as a thickener or the like, and is consequently preferred. Any one of these hydroxyalkyl cellulose ethers may be used individually, or two or more types may be used in combination.

A commercially available product may be used as the hydroxyalkyl cellulose ether, or the hydroxyalkyl cellulose ether may be synthesized. Hydroxyalkyl cellulose ethers can be synthesized, for example, by subjecting cellulose to an alkali treatment to form an alkali cellulose, and then reacting this alkali cellulose with an alkylene oxide. Examples of commercially available hydroxyalkyl cellulose ethers include HEC AL-15, AH-15, AX-15, LF-15, SH-15, SW-25, SG-25 and SY-25 manufactured by Sumitomo Chemical Co., Ltd., and HEC Daicel SE550, SE600 and SE900 manufactured by Daicel Chemical Industries, Ltd.

The cationization can be executed by reacting the water-soluble polymeric compound with a cationization agent, in the mixed solvent and in the presence of the alkali.

The cationization agent may be any compound that reacts with active hydrogen atoms within the water-soluble polymeric compound, such as the hydrogen atoms (active hydrogen atoms) of the hydroxyl groups within a water-soluble cellulose ether, thereby imparting the water-soluble polymeric compound with cationicity. Specific examples of the cationization agent include glycidyl trialkylammonium halides such as glycidyl trimethylammonium chloride, glycidyl triethylammonium chloride, glycidyl trimethylammonium bromide and glycidyl triethylammonium bromide, and ammonium halide compounds such as dimethyldiallylammonium chloride, methacryloyloxyethylene trimethylammonium chloride and 3-chloro-2-hydroxypropyl trimethylammonium chloride. Among these compounds, in terms of being inexpensive and exhibiting a high degree of reactivity, glycidyl trimethylammonium chloride is preferred.

The water-soluble polymeric compound and the cationization agent can be reacted, for example, by mixing the water-soluble polymeric compound with the mixed solvent and the alkali, and following stirring, adding the cationization agent and adjusting the temperature to a predetermined reaction temperature.

From the viewpoints of preventing the cationization of the water-soluble polymeric compound from proceeding in a localized manner, and enhancing the volumetric efficiency of the reaction container, the amount used of the mixed solvent is preferably within a range from 200 to 1,500 parts by mass, and more preferably from 300 to 800 parts by mass, per 100 parts by mass of the water-soluble polymeric compound.

The amount used of the alkali compound is preferably sufficient to provide an amount of alkali equivalent to 0.1 to 10% by mass relative to the mass of the water-soluble polymeric compound. The amount is preferably sufficient to yield a pH following addition of the alkali (namely, the pH during the cationization reaction) of 10 or greater. Ensuring that the pH is 10 or greater improves the reactivity. The pH is preferably within a range from 10 to 14, and more preferably from 12 to 13.

In particular, adding sufficient alkali to ensure that the pH within the reaction system following the cationization reaction is equal to the pH required for the reaction between the aminosilane compound and the cationized polymeric compound in the subsequent step (2) offers the advantage that no effort need be expended in adjusting the pH prior to performing step (2).

The pH mentioned above refers to the pH at the reaction temperature during the reaction between the water-soluble polymeric compound and the cationization agent.

The amount used of the cationization agent may be set appropriately with due consideration of factors such as the desired degree of cationization of the cationized polymeric compound, the yield of the cationization reaction, and the economic viability (such as whether the amount used yields an appropriate accompanying effect). For example, in the case where a water-soluble cellulose ether is cationized to obtain a cationized cellulose with a degree of cationization within a range from 0.3 to 2.5% by mass, the amount of the cationization agent is preferably sufficient to provide 0.1 to 1.4 mols, and more preferably 0.3 to 1.2 mols, of the cationization agent per glucose residue unit within the water-soluble cellulose ether.

From the viewpoints of accelerating the reaction and shortening the reaction time while preventing the reaction from proceeding overly rapidly, the reaction temperature is typically within a range from 40 to 60° C., and preferably from 45 to 55° C.

The reaction time varies depending on the reaction temperature and can therefore not be readily defined, but is typically within a range from approximately 2 to 4 hours.

The slurry obtained in step (1) may be supplied, as is, to step (2), or may be subjected to a deliquoring treatment to form a cake, which is then supplied to step (2). In terms of reducing the number of steps, it is preferable that a deliquoring treatment is not performed.

There are no particular limitations on the deliquoring treatment, and conventional solid-liquid separation methods such as filtration and centrifugal separation may be used. For example, the deliquoring treatment may be performed by using a filter fabric in a centrifugal deliquoring device.

The deliquoring treatment is preferably performed such that the solid fraction within the obtained cake is within a range from 30 to 90% by mass. The solid fraction is calculated by drying 1 g of the cake at 105° C. for 2 hours, and determining the difference in mass.

Further, if necessary, a pH adjustment may be performed prior to step (2), by adding an acid or alkali to the slurry or cake. For example, an acid may be added to adjust the pH to less than 10, for example in the neutral to acid region. Provided that the pH during the reaction between the aminosilane compound and the cationized polymeric compound in the subsequent step (2) is 10 or greater, the effects of the present invention are obtained even if the pH prior to that point is less than 10. Examples of the acid used for the above pH adjustment include the same acids as those mentioned below in relation to step (3), whereas examples of the alkali include the same alkali compounds as those described above.

Furthermore, if necessary, a treatment that involves adding a water-miscible organic solvent to the slurry or cake (a water-miscible organic solvent addition treatment) may also be performed. The slurry obtained in step (1) contains not only the cationized polymeric compound, but also residual water used during the cationization, and the water content within the overall solvent (mother liquor) incorporated within the slurry, namely the water content of the overall solvent in contact with the cationized polymeric compound, is typically within a range from 12 to 30% by mass. Even if the slurry is subjected to deliquoring to form a cake, the water content within the overall solvent is substantially the same. By performing an above-mentioned water-miscible organic solvent addition treatment to the slurry or cake, the water content within the overall solvent can be reduced. Reducing this water content can be expected to improve productivity and handling, for example by preventing the product from adhering to the dryer when step (4) is performed.

However, in the present invention, this water-miscible organic solvent addition treatment need not necessarily be performed, and the water-miscible organic solvent addition step may be excluded. Even if this step is not performed, a silane-modified cationized polymeric compound having favorable water dispersibility and solubility can still be obtained. The fact that this type of water-miscible organic solvent addition treatment need not be conducted is industrially advantageous, as it negates the necessity for providing a rectifier or the like for preparing a high-purity water-miscible organic solvent.

Examples of the water-miscible organic solvent used in the water-miscible organic solvent addition treatment include the same solvents as those described above for the water-miscible organic solvent used during the cationization. Any one of these water-miscible organic solvents may be used individually, or two or more solvents may be used in combination.

Further, the water-miscible organic solvent may be added as a mixed solvent with water. In this case, the proportion of water within the mixed solvent may be any proportion, provided that the water content within the overall solvent (mother liquor) incorporated within the slurry or cake of the cationized polymeric compound following addition of the mixed solvent is less than the water content prior to addition, and therefore this proportion of water within the mixed solvent may be selected appropriately in accordance with the water content within the slurry or cake to which the mixed solvent is to be added.

In those cases where a water-miscible organic solvent addition treatment is performed, the water content within the overall solvent following the addition of the water-miscible organic solvent or the mixed solvent is preferably not more than 10% by mass, and more preferably within a range from 2 to 7% by mass.

Specific examples of the method used for executing the water-miscible organic solvent addition treatment include the methods (1) and (2) described below.

Method (1): a method in which the water-miscible organic solvent or a mixed solvent containing the water-miscible organic solvent and water is added to the slurry and mixed.

Method (2): a method in which the slurry is first subjected to a deliquoring treatment, and the water-miscible organic solvent or a mixed solvent containing the water-miscible organic solvent and water is then added to the resulting cake.

In method (1), the water-miscible organic solvent or the mixed solvent may be added so as to achieve a desired value for the water content within the overall solvent (mother liquor) incorporated within the slurry following the addition.

In method (2), there are no particular limitations on the deliquoring treatment, and conventional solid-liquid separation methods such as filtration and centrifugal separation may be used. For example, the deliquoring treatment may be performed by using a filter fabric in a centrifugal deliquoring device.

This deliquoring treatment is preferably performed such that the solid fraction within the obtained cake is within a range from 30 to 90% by mass. The solid fraction is calculated by drying 1 g of the cake at 105° C. for 2 hours, and determining the difference in mass.

In method (2), examples of the method used for adding the water-miscible organic solvent or the mixed solvent containing the water-miscible organic solvent and water to the obtained cake include the methods (2a) and (2b) described below.

Method 2(a): a method in which the obtained cake is redispersed in the water-miscible organic solvent or the mixed solvent.

Method 2(b): a method in which the water-miscible organic solvent or the mixed solvent is sprayed onto the obtained cake in the form of a shower.

In method 2(a), the amount used of the water-miscible organic solvent or the mixed solvent may be set appropriately so as to achieve a desired value for the water content within the overall solvent (mother liquor) incorporated within the slurry following the redispersion.

In cases such as method 2(b) where the cake treatment is performed using a sprayed shower, the shower may be applied so as to achieve a desired value for the water content within the mother liquor incorporated within the treated cake.

When the cake is treated using a sprayed shower, a continuous treatment method may be employed where the cake is loaded on a belt conveyor or the like, and the shower is sprayed onto the cake from above.

The "water content within the overall solvent" can be confirmed by letting the slurry settle or performing a centrifugal separation and then extracting the supernatant and measuring the water content therein, or by performing deliquoring of the slurry following addition of the water-miscible organic solvent or the mixed solvent and measuring the water content within the deliquored liquid.

The water content within a liquid can be measured by the Karl Fischer method, using a commercially available water content measuring device such as the Aquacounter AQV-7 manufactured by Hiranuma Sangyo Corporation.

The water-miscible organic solvent addition treatment may also function as a purification treatment for the cationized polymeric compound. For example, in those cases where an acid is added following completion of the above-mentioned step (1), the resulting slurry will contain salts produced as a result of neutralization, but performing the water-miscible organic solvent addition treatment can wash away and remove these salts.

However, if a water-miscible organic solvent or a mixed solvent containing only a small amount of water is used for this treatment, then the removal efficiency of neutral salts tends to deteriorate, and there is a possibility that neutral salts may remain within the obtained cationized polymeric compound. Accordingly, if an acid is added following step (1), then from the viewpoint of ensuring favorable removal efficiency of neutral salts, a separate purification treatment (washing) of the cationized polymeric compound using a mixed solvent of a water-miscible organic solvent and water having a water content of approximately 15 to 30% by mass is preferably performed prior to the water-miscible organic solvent addition treatment.

The slurry or cake obtained following the water-miscible organic solvent addition treatment may be supplied, as is, to step (2), or a deliquoring treatment may be performed prior to step (2). From the viewpoint of minimizing the number of steps, a deliquoring treatment is preferably not performed.

There are no particular limitations on the method used for the deliquoring treatment, and conventional solid-liquid separation methods such as filtration and centrifugal separation may be used. For example, the deliquoring treatment may be performed by using a filter fabric in a centrifugal deliquoring device.

The deliquoring treatment at this point is preferably performed so as to achieve a solid fraction within the obtained cake of 30 to 90% by mass. The solid fraction is calculated by drying 1 g of the cake at 105° C. for 2 hours, and determining the difference in mass.

In those cases where a water-miscible organic solvent addition treatment is performed prior to step (2), in order to ensure the effects of that treatment are not lost, step (2) is preferably performed immediately following the treatment, without bringing the cationized polymeric compound into contact with a solvent containing 10% by mass or more of water (such as a mixed solvent having a water content of 10% by mass or greater).

[Step (2)]

In step (2), an aminosilane compound is added to the slurry or cake obtained in step (1), thus treating the cationized polymeric compound with the aminosilane compound. This forms a silane-modified cationized polymeric compound.

It is thought that the silane-modified cationized polymeric compound formed in step (2) has a structure in which a hydrolysate of the aminosilane compound is adsorbed to the surface of the cationized polymeric compound. In other words, the slurry obtained in step (1) or the cake produced therefrom contains water. Accordingly, when the aminosilane compound is added, hydrolysis of the hydrolyzable groups bonded to the Si atom within the aminosilane compound (namely, those hydrolyzable groups such as alkoxy groups which can generate hydroxyl groups upon hydrolysis) generates silanol groups (Si—OH). It is surmised that these silanol groups adsorb via hydrogen bonding to the hydroxyl groups of the cationized polymeric compound (such as the hydroxyl groups of a cationized cellulose or the hydroxyl groups formed following epoxy cleavage of the cationization agent).

Step (2) may be performed after a pH adjustment has been conducted in step (3) following step (1), or may be performed immediately after step (1) with no pH adjustment. Although there are no particular limitations on the pH, the amount added of the aminosilane compound is typically within a range from 0.05 to 20% by mass relative to the mass of the water-soluble polymeric compound (the water-soluble polymeric compound used as the raw material for the cationized polymeric compound that is subjected to treatment with the aminosilane compound), and the treatment of the cationized polymeric compound with the aminosilane compound (namely, the silane treatment) is preferably conducted under alkaline conditions with a pH of 10 or greater.

If the acid addition step of step (3) described below is performed prior to step (2) and the pH is adjusted to a value of less than 10, then in order to achieve satisfactory water dispersibility, the amount added of the aminosilane compound is preferably within a range from 0.3 to 20% by mass, more preferably from 0.5 to 15% by mass, still more preferably from 0.9 to 12% by mass, and most preferably from 1.0 to 6% by mass. In contrast, in those cases where step (2) is performed under alkaline conditions with a pH of 10 or greater, as long as the amount added of the aminosilane compound is at least 0.05% by mass, the water dispersibility of the resulting silane-modified cationized polymeric compound can be improved.

Further, satisfactory water dispersibility can be obtained when the amount of the aminosilane compound is 20% by mass or less, and if the amount exceeds 20% by mass, then although satisfactory water dispersibility can be ensured, the amount of the cationized polymeric compound active ingredient decreases and the cost increases, making the product undesirable from an industrial standpoint. Moreover, if the amount of the aminosilane compound exceeds 50% by mass, then the water dispersibility actually deteriorates. Furthermore, if the pH is 10 or greater, then satisfactory water dispersibility can be achieved with a smaller amount of added aminosilane compound.

In those cases where step (2) is performed under alkaline conditions with a pH of 10 or greater, the amount added of the aminosilane compound, relative to the water-soluble polymeric compound, is preferably within a range from 0.1 to 15% by mass, more preferably from 0.2 to 10% by mass, and most preferably from 0.5 to 5% by mass.

The pH during the silane treatment is preferably within a range from 10 to 14, and more preferably from 11 to 13.

The pH mentioned above refers to the pH at the treatment temperature during the silane treatment.

In order to achieve alkaline conditions with a pH of 10 or greater, no pH adjustment is necessary in those cases where the pH of the slurry or cake obtained in step (1) is 10 or greater, but if the pH of the slurry or cake is less than 10, then an alkali may be added to adjust the pH to a predetermined value.

Provided the pH remains at a value of 10 or greater, an acid may be added to the slurry or cake obtained in step (1).

Examples of alkali compounds that may be used for the above-mentioned pH adjustment include the same alkali compounds as those described above in relation to step (1), whereas examples of acids that may be used include the same acids as those described below in relation to step (3).

The pH adjustment is preferably performed prior to the addition of the aminosilane compound.

In this manner, by setting the amount added of the aminosilane compound and the pH during the silane treatment to the respective ranges described above, the resulting improvement in the adsorption efficiency of the aminosilane compound to the cationized polymeric compound is one reason for the improvement in the water dispersibility of the resulting silane-modified cationized polymeric compound.

In other words, as a result of investigating the relationship between the pH during the silane treatment and the amount of adsorption of the aminosilane compound, the inventors of the present invention found that when the silane treatment is performed with the amount of added aminosilane compound set to a fixed amount while the pH is varied within a range from 4 to 13, there is almost no effect on the amount of adsorption when the pH is less than 10, but when the pH is 10 or greater, the amount of adsorption increases markedly in proportion with the pH. For example, as indicated by the results described below for Examples 1, 4, 5 and 6 and Comparative Example 2, when HEC is used as the water-soluble polymeric compound and 3-aminopropyltriethoxysilane is added as the aminosilane compound in an amount of 2% by mass relative to the mass of the HEC, the amount of adsorption varies even though the amount of added aminosilane compound is the same, with the amount of adsorption when the pH is 12 being approximately 2.3 times that when the pH is 7.

Further, in addition to the improvement in the adsorption efficiency described above, it is thought that another reason for the improvement in the water dispersibility is that the adsorption of the aminosilane compound to the cationized polymeric compound occurs more uniformly.

In other words, in conventional methods where the pH within the reaction system is low or the concentration of the aminosilane compound is high, the aminosilane compound tends to oligomerize via a self-condensation process, and exists in that state within the reaction system. It is thought that because these oligomers are bulky, they are unable to adsorb within the interior of the cationized polymeric compound particles and also tend to adsorb non-uniformly to the surfaces of the particles, meaning the effects of the silane treatment are unable to be realized satisfactorily.

In contrast, when the pH in the reaction system is 10 or greater and the concentration of the aminosilane compound is comparatively low, it is surmised that the stability of the aminosilane compound is favorable, meaning self-condensation either does not occur or occurs only at very low levels, meaning the majority of the aminosilane compound exists as the monomer. As a result, it is thought that the surfaces of the cationized polymeric compound particles are coated uniformly, with the aminosilane compound also adsorbing within the interior of the particles, meaning that the effects of the silane treatment are able to be realized satisfactorily, so that even if the amount of adsorption is similar to that observed with the oligomers, a superior level of water dispersibility is able to be obtained.

Generally, the types of compounds used as aminosilane-based coupling agents can be used as the aminosilane compound, and specific examples include compounds represented by general formula (I) shown below.

$$(R^1)(R^2)N-R^3-Si(X)_n(R^4)_{3-n} \quad (I)$$

In the formula, each of $R^1$ and $R^2$ independently represents a hydrogen atom or an organic group, $R^3$ represents an alkylene group, X represents a hydrolyzable group that generates a hydroxyl group upon hydrolysis, $R^4$ represents an alkyl group, and n represents an integer of 1 to 3.

Examples of the organic group for $R^1$ and $R^2$ include alkyl groups, aminoalkyl group and carboalkoxyalkyl groups.

The alkylene group for $R^3$ is preferably an alkylene group of 1 to 5 carbon atoms.

The hydrolyzable group for X is preferably an alkoxy group. The alkoxy group preferably contains 1 to 3 carbon atoms.

The alkyl group for $R^4$ is preferably an alkyl group of 1 to 3 carbon atoms.

n is preferably 2 or 3, and most preferably 3.

Examples of preferred aminosilane compounds include 3-aminopropyltrimethoxysilane, 3-aminopropyltriethoxysilane, 3-aminopropylmethyldimethoxysilane, 3-aminopropyltrimethylethoxysilane, N-2-aminoethyl-3-aminopropyltrimethoxysilane, N-2-aminoethyl-3-aminopropyltriethoxysilane, 3-aminopropyldiethoxysilane, 4-aminobutylmethyldiethoxysilane, and N-2-carboethoxyethyl-3-aminopropyltriethoxysilane. Among these, 3-aminopropyltriethoxysilane, N-2-aminoethyl-3-aminopropyltriethoxysilane, 3-aminopropyltrimethylethoxysilane, 3-aminopropyldiethoxysilane, 4-aminobutylmethyldiethoxysilane, and N-2-carboethoxyethyl-3-aminopropyltriethoxysilane and the like are preferred, as methanol liberation and the like does not occur in those cases where the final silane-modified cationized polymeric compound is used within a shampoo or a body soap or the like.

Commercially available products such as KBE-903, KBE-603 and KBE-9103 manufactured by Shin-Etsu Chemical Co., Ltd., and AY43-059 manufactured by Dow Corning Toray Co., Ltd. may be used as the aminosilane compound.

The addition of the aminosilane compound may be performed using conventional methods. For example, the aminosilane compound may be sprayed onto the slurry or cake of the cationized polymeric compound.

Following addition of the aminosilane compound, stirring is preferably conducted to ensure a more uniform silane treatment.

There are no particular limitations on the treatment temperature during the silane treatment, and the temperature may be set appropriately in accordance with the intended purpose, although the temperature is preferably within a range from 20 to 80° C., more preferably from 25 to 75° C., and still more preferably from 30 to 70° C. Provided this treatment temperature is at least 20° C., the silane treatment proceeds satisfactorily and the water dispersibility of the obtained silane-modified cationized polymeric compound powder is good, and provided the temperature is not more than 80° C., the coloring of the silane-modified cationized polymeric compound powder is favorable.

There are no particular limitations on the treatment time, which may be selected appropriately in accordance with the treatment temperature and the intended purpose and the like. The treatment time is preferably within a range from 5 to 120 minutes, more preferably from 10 to 100 minutes, and still more preferably from 15 to 80 minutes. Provided the treatment time is at least 5 minutes, the silane treatment proceeds satisfactorily and the water dispersibility of the obtained silane-modified cationized polymeric compound powder is good, whereas provided the treatment time is not more than 120 minutes, the coloring of the silane-modified cationized polymeric compound powder is favorable.

The product obtained in step (2) (the slurry or cake containing the silane-modified cationized polymeric compound) is supplied to the next step (3) or step (4), either as is, or after performing an optional deliquoring treatment. If the next step performed is step (3), then from the viewpoint of reducing the number of steps, a deliquoring treatment is preferably not performed. On the other hand, is step (3) is excluded and the next step performed is step (4), then from the viewpoint of reducing the drying load, a preliminary deliquoring treatment is preferably performed.

There are no particular limitations on the deliquoring treatment, and conventional solid-liquid separation methods such as filtration and centrifugal separation may be used. For example, the deliquoring treatment may be performed by using a filter fabric in a centrifugal deliquoring device.

The deliquoring treatment conducted at this point is preferably performed such that the solid fraction within the obtained cake is within a range from 30 to 90% by mass. The solid fraction is calculated by drying 1 g of the cake at 105° C. for 2 hours, and determining the difference in mass.

Furthermore, if necessary, prior to performing step (3) or step (4), the product obtained in step (2) may be subjected to an addition of a water-miscible organic solvent (namely, a water-miscible organic solvent addition treatment). The product contains not only the silane-modified cationized polymeric compound, but also water, in a similar manner to the slurry obtained in step (1). By subjecting the product obtained in step (2) to a water-miscible organic solvent addition treatment, the water content within the overall solvent can be reduced. Reducing this water content can be expected to improve productivity and handling, for example by preventing the product from adhering to the dryer when step (4) is performed.

The water-miscible organic solvent addition treatment can be performed in the same manner as the water-miscible organic solvent addition treatment described above in relation to step (1).

[Step (3)]

In step (3), an acid is added to the slurry obtained in step (1) or the product (the slurry or cake containing the silane-modified cationized polymeric compound) obtained in step (2). By performing this step, the pH of an aqueous solution of the final silane-modified cationized polymeric compound can be adjusted to a value within a range from weakly alkaline to acidic.

In the present invention, step (3) is an optional step that need not necessarily be performed.

The acid used in step (3) may be any acid capable of neutralizing the alkali used in step (1) or step (2), and specific examples include strong acids such as sulfuric acid, hydrochloric acid and nitric acid, and weak acids such as acetic acid and phosphoric acid. Among these, inexpensive acids such as hydrochloric acid, sulfuric acid and nitric acid are preferred.

There are no particular limitations on the amount of acid used, which may be selected appropriately with due consideration of the pH required following addition of the acid.

In consideration of the pH obtained when the final silane-modified cationized polymeric compound is dissolved to form an aqueous solution, the pH following addition of the acid, measured at a temperature of 50° C., is preferably within a range from 4.0 to 7.0, and more preferably from 5.0 to 6.5.

When the acid is added, the resulting slurry will contain salts generated as a result of neutralization. Accordingly, following addition of the acid, a purification treatment for washing away and removing these salts may be performed prior to performing the aminosilane compound treatment.

If the above-mentioned purification treatment is performed, then in terms of ensuring favorable removal efficiency of neutral salts, a mixed solvent of a water-miscible organic solvent and water is preferably used, and the use of a mixed solvent of a water-miscible organic solvent and water having a water content of approximately 15 to 30% by mass is particularly desirable.

The product obtained upon performing step (3) on the product from step (2) may be supplied to the next step (4), either as is, or following an optional deliquoring treatment. If step (4) is performed next, then from the viewpoint of reducing the drying load, a preliminary deliquoring treatment is preferably performed.

There are no particular limitations on the deliquoring treatment, and conventional solid-liquid separation methods such as filtration and centrifugal separation may be used. For example, the deliquoring treatment may be performed by using a filter fabric in a centrifugal deliquoring device.

The deliquoring treatment conducted at this point is preferably performed such that the solid fraction within the obtained cake is within a range from 30 to 90% by mass. The solid fraction is calculated by drying 1 g of the cake at 105° C. for 2 hours, and determining the difference in mass.

Further, if necessary, prior to performing step (4), the product obtained in step (3) may be subjected to an addition of a water-miscible organic solvent (namely, a water-miscible organic solvent addition treatment). The product contains not only the silane-modified cationized polymeric compound, but also water, in a similar manner to the slurry obtained in step (1) and the product obtained in step (2). By subjecting the product obtained in step (3) to a water-miscible organic solvent addition treatment, the water content within the overall solvent can be reduced. Reducing this water content can be expected to improve productivity and handling, for example by preventing the product from adhering to the dryer when step (4) is performed.

The water-miscible organic solvent addition treatment can be performed in the same manner as the water-miscible organic solvent addition treatment described above in relation to step (1).

[Step (4)]

In step (4), the product obtained in step (2) or step (3) (namely, the slurry or cake containing the silane-modified cationized polymeric compound) is dried. This yields the silane-modified cationized polymeric compound as a powder.

In the present invention, in step (4), by performing a primary drying treatment in which drying is performed under mild drying conditions with the main purpose of reducing the amount of residual organic solvent, and a secondary drying treatment step in which drying is performed under higher temperature conditions with the main purpose of reducing the loss on drying for the product obtained following the primary drying treatment, the water dispersibility of the obtained silane-modified cationized polymeric compound powder can be improved, and the removal efficiency of residual water-miscible organic solvent retained within the powder can be improved, meaning a silane-modified cationized polymeric compound powder having a minimal amount of residual organic solvent can be obtained with a short drying treatment.

In this description and in the claims, the "degree of vacuum" indicates the pressure on an absolute pressure basis.

Investigations conducted by the inventors of the present invention revealed that in conventional processes such as those disclosed in Patent Documents 1 and 2 described above in the background art, the powder obtained following the drying treatment tends to suffer from unsatisfactory removal of the organic solvent (water-miscible organic solvent) used in the production, with residual solvent retained in the powder. This problem of residual organic solvent requires improvement in terms of the odor and environmental considerations during handling. Possible methods of better removing the organic solvent include increasing the temperature or lengthening the drying time. However, even if the drying temperature is simply increased, reducing the amount of residual organic solvent is difficult, and other problems can also arise, including deterioration in the water dispersibility, solubility and coloring of the obtained silane-modified cationized polymeric compound powder. Further, lengthening the drying time is undesirable from a production efficiency perspective.

In response to these problems, performing the drying treatment in two stages in the manner described above enables the amount of residual organic solvent to be reduced with a short drying treatment, and also enables a silane-modified cationized polymeric compound to be obtained that exhibits favorable levels of water dispersibility and the like.

It is thought that the reason that the above-mentioned secondary drying treatment improves the water dispersibility is either because the silanol groups generated by hydrolysis of the aminosilane compound and the hydroxyl groups of the cationized polymeric compound undergo a dehydration condensation reaction to form chemical bonds, or in those cases where chemical bonds are not formed, because the water that is hydrogen bonded to the silanol groups and hydroxyl groups is removed, making the surface of the cationized polymeric compound more hydrophobic.

(Primary Drying Treatment)

In the primary drying treatment, the product mentioned above is treated by drying under reduced pressure, at a temperature of 50 to 140° C. and under a degree of vacuum of 4.0 to 53.3 kPa (30 to 400 Torr). If the temperature and degree of vacuum are outside the respective ranges above, then the residual organic solvent within the silane-modified cationized polymeric compound may not be able to be reduced satisfactorily.

The primary drying treatment is performed with the main purpose of reducing the amount of residual organic solvent. In order to convert the slurry or cake containing the silane-modified cationized polymeric compound obtained in the above-mentioned step (2) or step (3) to a powder that exhibits excellent water dispersibility, additional drying under higher temperature conditions such as those described below for the secondary drying treatment must be performed to reduce the loss on drying to 2% by mass or less. However, if this higher temperature drying is performed under reduced pressure, then if an initial drying treatment under milder conditions with the temperature and degree of vacuum set within specified ranges is not performed first, then even if the loss on drying is reduced by evaporation of the water content, the reduction in the amount of residual organic solvent tends to be unsatisfactory.

Investigations conducted by the inventors of the present invention revealed that under conditions which yield high evaporations rates for both the residual organic solvent and the water content that is to be evaporated and removed, evaporation of the residual organic solvent actually becomes more difficult. On the other hand, if the conditions are altered so that evaporation rate of the water content is too slow, then the drying time lengthens considerably, which is also undesirable.

The treatment temperature for the primary drying treatment is preferably at least 60° C., and the upper limit for the temperature is preferably not more than 120° C., more preferably not more than 100° C., and still more preferably 95° C. or less. Further, the degree of vacuum is preferably at least 13.3 kPa (100 Torr), and is more preferably within a range from 16.6 to 40.0 kPa (125 to 300 Torr), and still more preferably from 20.0 to 33.3 kPa (150 to 250 Torr).

In order to achieve a more efficient reduction in the amount of residual organic solvent, the reduced-pressure drying is preferably performed so that within the respective temperature and degree of vacuum ranges mentioned above, a higher degree of vacuum is used when the temperature is comparatively low, and a lower degree of vacuum is used when the temperature is comparatively high.

At a temperature of at least 50° C. but less than 70° C., the degree of vacuum is preferably at least 4.0 kPa, and more preferably 6.7 kPa (50 Torr) or greater. The upper limit for the degree of vacuum is preferably not more than 20 kPa, and more preferably 13.3 kPa or less.

At a temperature of at least 70° C. but less than 90° C., the degree of vacuum is preferably at least 10.0 kPa (75 Torr), and more preferably 13.3 kPa or greater. The upper limit for the degree of vacuum is not more than 53.3 kPa, and is preferably 46.7 kPa (350 Torr) or less.

At a temperature of at least 90° C. but less than 110° C., the degree of vacuum is preferably at least 10.0 kPa, and more preferably 13.3 kPa or greater. The upper limit for the degree of vacuum is not more than 53.3 kPa.

At a temperature of at least 110° C. but less than 140° C., the degree of vacuum is preferably at least 13.3 kPa, and more preferably 20.0 kPa or greater. The upper limit for the degree of vacuum is preferably not more than 53.3 kPa.

With the exception of setting the temperature and degree of vacuum within predetermined ranges, the primary drying treatment can be performed using conventional methods, and for example, may be performed using a commonly used reduced-pressure drying device.

Examples of reduced-pressure drying devices include mixing and grinding-type reduced-pressure drying devices, vibrating vacuum drying devices, vacuum mixing dryers, swing-type vacuum drying devices and drum vacuum drying devices.

In the present invention, from the viewpoint of suppressing adhesion of the above-mentioned product to the drying device during treatment, a mixing and grinding-type reduced-pressure drying device is preferred.

A mixing and grinding-type reduced-pressure drying device is a reduced-pressure drying device having a structure in which a mixing shaft having a mixing blade (such as a shovel or agitator) attached thereto is provided in the center of a circular cylindrical mixing tank, and choppers are provided around the inner walls of the mixing tank. Conventional devices typically used for mixing and granulation can be used as the mixing and grinding-type reduced-pressure drying device having the structure described above, and specific examples of these conventional devices include a Henschel mixer (manufactured by Mitsui Miike Chemical Engineering Machinery, Co., Ltd.), high-speed mixer (manufactured by Fukae Powtec Co., Ltd.) and vertical granulator (manufactured by Powrex Corporation). Horizontal mixing tanks having a mixing shaft in the center of a circular cylindrical tank with mixing blades attached to the shaft for mixing the powder are particularly preferred, and examples of such devices include a Lodige mixer manufactured by Matsubo Corporation and a Ploughshare mixer manufactured by Pacific Machinery & Engineering Co., Ltd.

The mixing conditions employed during use of the mixing and grinding-type reduced-pressure drying device may be set appropriately with due consideration of factors such as the capacity of the mixing tank, the type of mixing blades employed, achieving favorable detachment of adhered particles and crushing of aggregates, and improving the thermal efficiency via mixing. Specific examples of preferred conditions in the case of a VT-20 Lodige mixer with a capacity of 20 L (manufactured by Matsubo Corporation) include a shovel rotational rate of 80 to 160 rpm (clearance 1.5 to 2 mm) and a chopper rotational rate of 500 to 3,000 rpm.

When the water-miscible organic solvent is removed by the primary drying treatment, generating a water-rich product, the product becomes prone to adhesion to the drying device. Then, as drying progresses and the water content is reduced (for example, when the loss on drying falls to approximately 15% or lower), this type of adhesion becomes less likely.

Accordingly, once the water-miscible organic solvent has started to be removed by the primary drying treatment (namely, in the latter stages of the primary drying treatment through to the initial stages of the secondary drying treatment), reducing the shovel rotational rate can be effective in suppressing adhesion. Further, during the middle to latter stages of the secondary drying treatment, increasing the shovel rotational rate again is effective in shortening the drying time.

Furthermore, the main purpose of the choppers is grinding the powder, and as the drying proceeds and adhered particles and aggregates disappear (for example, in the middle to latter stages of the secondary drying treatment), the choppers become unnecessary. At this stage, reducing the rotational rate of the choppers or stopping the choppers altogether is preferred in terms of inhibiting dust generation.

The loss on drying (% by mass) is calculated using the procedure described below.

A weighing bottle is adjusted to a constant mass, and the mass of the bottle (mass A) is weighed accurately. Subsequently, 1 g (mass B) of the target sample to be measured is weighed accurately into the weighing bottle, and the bottle is then heated at 105° C. for 2 hours and then left to cool to room temperature inside a desiccator. The mass of the bottle (mass C) is then re-measured. The loss on drying is calculated from the mass A, mass B and mass C using the numerical formula below.

Loss on drying (%)={(mass $A$+mass $B$)−mass $C$}/mass $B$×100  [Numerical formula 1]

In the present invention, the primary drying treatment described above is preferably conducted until the loss on drying is not more than 30%, more preferably not more than 25%, and still more preferably 20% or less. This enables the organic solvent within the product to be removed satisfactorily, and enables a silane-modified cationized polymeric compound having an amount of residual organic solvent of less than 0.10% by mass to be obtained as a final product. There are no particular limitations on the lower limit for the loss on drying, which may even be 0%. In terms of production efficiency, the lower limit for the loss on drying is preferably at least 1% by mass, and more preferably 5% by mass or more.

The conditions for the primary drying treatment may be set in accordance with the intended purpose so that, in combination with the subsequently performed secondary drying treatment, the amount of residual organic solvent within the targeted silane-modified cationized polymeric compound powder can be reduced to a target value. The amount of residual organic solvent within the targeted silane-modified cationized polymeric compound powder is preferably less than 0.10% by mass, and in order to achieve such an amount, the amount of residual organic solvent following completion of the primary drying treatment is preferably not more than 0.20% by mass, and more preferably 0.10% by mass or less. There are no particular limitations on the lower limit for the amount of residual organic solvent following the primary drying treatment, and the amount is preferably as small as possible.

The primary drying treatment is preferably continued until the amount of residual organic solvent reaches a preferred amount described above.

Examples of the residual organic solvent retained within the silane-modified cationized polymeric compound include the water-miscible organic solvent used during the slurry preparation.

The amount of residual organic solvent can be measured using conventional methods such as gas chromatography. One specific example is the method described in the examples below, in which isopropanol is used as the organic solvent.

(Secondary Drying Treatment)

In the secondary drying treatment, the product from the primary drying treatment described above is treated at a temperature of 90 to 155° C. There are no particular limitations on the degree of vacuum, which may be selected in accordance with the intended purpose of the drying, but in terms of improving the drying efficiency, the treatment is preferably performed at a degree of vacuum of not more than 13.3 kPa (100 Torr). If the temperature and degree of vacuum are outside the respective ranges above, then the water dispersibility and solubility of the resulting silane-modified cationized polymeric compound powder may deteriorate. In particular, if the temperature is too high, then there is a danger that the coloring of the powder may deteriorate.

The treatment temperature during the secondary drying treatment is preferably within a range from 90 to 150° C., more preferably from 105 to 145° C., and still more preferably from 105 to 125° C. Further, the degree of vacuum is preferably not more than 6.7 kPa (50 Torr), and more preferably 1.3 kPa (10 Torr) or less.

With the exception of setting the temperature and the degree of vacuum with the predetermined ranges described above, the secondary drying treatment may be performed using the same method as that described for the primary drying treatment.

The secondary drying treatment is preferably performed until the loss on drying (% by mass) decreases to 2% by mass or less, as this ensures that the silane-modified cationized polymeric compound exhibits superior water dispersibility. The loss on drying is more preferably 1% by mass or less, and may be 0.

The loss on drying is determined using the same procedure as that described above.

The primary drying treatment step and the secondary drying treatment step may be performed in a continuous manner, or with a pause between steps.

Furthermore, another drying treatment that does not correspond with either the primary drying treatment or the secondary drying treatment may be conducted between the primary drying treatment step and the secondary drying treatment step. For example, in those cases where the secondary drying treatment is performed in a continuous manner following completion of the primary drying treatment, the drying conditions may transition through intermediate treatment conditions (for example, a degree of vacuum of less than 13.4 kPa but exceeding 13.3 kPa).

The particle size of the silane-modified cationized polymeric compound obtained in the manner described above may be selected appropriately in accordance with factors such as the intended use of the compound. The particle size is preferably within a range from 10 to 1,000 μm, more preferably from 30 to 800 μm, and still more preferably from 50 to 600 μm. Provided the particle size is at least 10 μm, the water dispersibility improves and dust generation at the time of use is unlikely, meaning handling is favorable. Provided the particle size is not more than 1,000 μm, the solubility of the compound within water is favorable.

Further, when the silane-modified cationized polymeric compound is converted to a 2% by mass aqueous solution, the pH of the aqueous solution at 25° C. is preferably within a range from 5 to 7.5.

According to the production process of the present invention described above, a silane-modified cationized polymeric compound having a reduced amount of residual organic solvent and excellent water dispersibility can be produced. When this silane-modified cationized polymeric compound is added to an aqueous solvent such as water or a mixed solvent containing water and a water-miscible organic solvent, the compound can be easily dispersed in a short period of time. Further, the compound also exhibits excellent solubility in aqueous solvents. The "water dispersibility" can be evaluated using the method described below in the examples, and by employing the present invention, a silane-modified cationized polymeric compound having superior water dispersibility of not more than 60 seconds, and even 30 seconds or less, can be obtained with good efficiency.

In particular, when the above-mentioned primary drying treatment and secondary drying treatment are performed, a silane-modified cationized polymeric compound powder having a reduced amount of residual organic solvent, for example an amount of residual organic solvent of less than 0.10% by mass, can be produced with a short drying treatment. This type of silane-modified cationized polymeric compound powder having a reduced amount of residual organic solvent is unlikely to suffer problems of odor or coloration, and also exhibits superior properties in terms of safety and environmental considerations during handling.

Moreover, it is thought that because of the silane modification treatment, the above silane-modified cationized polymeric compound exhibits improved interactions with the various components contained within all manner of cosmetic compositions.

Accordingly, the silane-modified cationized polymeric compound obtained using the production process of the present invention is useful for a wide range of applications, including as a conditioning agent for shampoos and body soaps, as well as a component within hair cosmetics, basic skin care cosmetics, makeup cosmetics, perfumed cosmetics, suntan cosmetics, sunblock cosmetics, nail cosmetics and bath cosmetics. Among these, the silane-modified cationized polymeric compound is particularly useful as a conditioning agent.

Further, with the production process of the present invention in which the silane treatment is performed under alkaline conditions, the number of steps is fewer and the process is simpler than conventional processes in which a neutralization treatment is performed following the cationization and prior to performing the silane treatment. For example, because the neutral salts generated by the neutralization tend to have an adverse effect on the silane treatment, in some cases, purification treatments such as washing and deliquoring have been required prior to the silane treatment, but with the production process of the present invention, all of the steps prior to drying can be executed in a continuous manner within the same reaction vessel, which is very useful from an industrial viewpoint.

EXAMPLES

The present invention is described below in further detail using a series of examples.

In the following description, unless specified otherwise, the units "%" and "ppm" refer to mass-based values.

Within the examples and comparative examples described below, the drying treatments (the primary drying treatment and the secondary drying treatment) performed in Examples 1 to 6, 8 to 15, and Comparative Examples 1 to 6 were performed using a rotary vacuum evaporator (N-N series, manufactured by EYELA) and a 500 mL round-bottom flask.

Further, in Example 7, the drying treatments (the primary drying treatment and the secondary drying treatment) were performed using a Lodige mixer (manufactured by Matsubo Corporation).

The various measurement methods used in the examples and comparative examples are described below.
<Measurement Methods>
(a) Water Content (%) (Karl Fischer Method)

The water content was measured using an Aquacounter AQV-7 manufactured by Hiranuma Sangyo Corporation, using an analysis sample size of 0.3 g.
(b) pH The pH at the reaction temperature (cationization or silane treatment) was measured using a pH meter PH71 manufactured by Yokogawa Electric Corporation.

In the examples and comparative examples described below, the reaction temperature during the cationization and the silane treatment was 50° C. in both cases.
(c) Loss on Drying A glass weighing bottle with a lid was heated at 105° C. for one hour to achieve a constant mass. The bottle was then left to cool to room temperature (25° C.) inside a desiccator, and the mass (mass A) of the weighing bottle was then measured accurately.

Subsequently, 1 g (mass B) of the analysis sample was weighed accurately into the constant mass weighing bottle. The bottle was then heated at 105° C. for 2 hours, and following cooling to room temperature inside a desiccator, the mass of the bottle (mass C) was re-measured. The loss on drying was calculated from the mass A, mass B and mass C using the numerical formula below.

$$\text{Loss on drying (\%)} = \{(\text{mass } A + \text{mass } B) - \text{mass } C\}/\text{mass } B \times 100 \qquad \text{[Numerical formula 2]}$$

(d) Amount of Residual Isopropanol (IPA) at Completion of the Primary Drying Treatment A 0.5 g analysis sample was weighed accurately and then dissolved in 49.5 g of accurately weighed distilled water. The thus obtained aqueous solution was subjected to ultrafiltration using an ultra filter unit USY-1 manufactured by Advantec MFS, Inc.

The filtrate was used as an analysis sample, and analyzed by gas chromatography (GC-2010, manufactured by Shimadzu Corporation).

(Analysis Conditions)

Analysis column: Rtx–200 (30 m×0.32 mm 1 μm df) manufactured by Restek Corporation Column temperature: 40° C. (hold for 5 minutes)→increase temperature at 30° C./minute→290° C. (hold for 5 minutes)

Injection temperature: 260° C.

Linear rate: 25 cm/second helium

Detector: FID 290° C.

Split ratio: 1/20

Sample injection volume: 1 μL (Quantitative Method)

Using 2-propanol (UGR grade, manufactured by Kanto Chemical Co., Inc., purity: 99.9%), aqueous solutions of 2-propanol having concentrations of 2 ppm, 5 ppm, 10 ppm, 20 ppm, 50 ppm and 100 ppm were prepared, and a calibration curve was created. The amount of residual IPA in the above analysis sample was quantified using this calibration curve. A value of 0.02% or less was deemed to be below the detection limit (N.D.).

Example 1

To 30 g (100 parts by mass) of a hydroxyethyl cellulose (SH-15, manufactured by Sumitomo Chemical Co., Ltd., viscosity of a 2% by mass aqueous solution (25° C.): 1,200 mPa·s) were added 120 g (400 parts by mass) of an 85/15 (mass ratio) mixed solvent of isopropyl alcohol (IPA)/water, and 1.8 g (6 parts by mass) of a 25% by mass aqueous solution of sodium hydroxide, and the resulting mixture was stirred. Subsequently, the temperature was raised to 50° C., 15.8 g (53 parts by mass) of glycidyl trimethylammonium chloride (SY-GTA80, manufactured by Sakamoto Yakuhin Kogyo Co., Ltd., active component: 73% in an aqueous solution) was added as a cationization agent, and the resulting mixture was reacted for 3 hours to effect a cationization. At this time, the pH of the reaction slurry was 12. To the resulting slurry was added 0.6 g (2 parts by mass) of 3-aminopropyltriethoxysilane (KBE-903, manufactured by Shin-Etsu Chemical Co., Ltd., active component: 100%) as an aminosilane-based coupling agent, and treatment was performed by stirring the resulting mixture at 50° C. for 45 minutes. Subsequently, a 10% by mass IPA solution of hydrochloric acid was added to adjust the pH to 6, thus yielding a silane-modified cationized cellulose slurry. The silane-modified cationized cellulose slurry was deliquored, and the resulting cake (solid fraction: 60%) was subjected to a primary drying treatment for 1 hour at a temperature of 80° C. and a degree of vacuum of 20.0 kPa. A secondary drying treatment was then conducted for 1 hour at a temperature of 110° C. and a degree of vacuum of 1.3 kPa, thereby yielding the target silane-modified cationized cellulose powder.

Example 2

With the exception of altering the amount added of the 3-aminopropyltriethoxysilane to 0.15 g (0.5 parts by mass), the same operations as Example 1 were performed, yielding the target silane-modified cationized cellulose powder.

Example 3

With the exception of altering the amount added of the 3-aminopropyltriethoxysilane to 3.0 g (10 parts by mass), the same operations as Example 1 were performed, yielding the target silane-modified cationized cellulose powder.

Example 4

With the exceptions of altering the pH of the reaction slurry to 13 by adding a 25% aqueous solution of sodium hydroxide following the cationization, performing the primary drying treatment for 1 hour at a temperature of 100° C. and a degree of vacuum of 33.3 kPa, and performing the secondary drying treatment for 1 hour at a temperature of 140° C. and a degree of vacuum of 12.0 kPa, the same operations as Example 1 were performed, yielding the target silane-modified cationized cellulose powder.

Example 5

With the exception of altering the pH of the reaction slurry to 11 by adding a 10% by mass IPA solution of hydrochloric acid following the cationization, the same operations as Example 1 were performed, yielding the target silane-modified cationized cellulose powder.

Example 6

With the exception of altering the pH of the reaction slurry to 10 by adding a 10% by mass IPA solution of hydrochloric acid following the cationization, the same operations as Example 1 were performed, yielding the target silane-modified cationized cellulose powder.

Example 7

With the exception of performing the drying treatments (the primary drying treatment and the secondary drying treatment) using a VT-20 Lodige mixer with a capacity of 20 L (manufactured by Matsubo Corporation) under the conditions described below, the same operations as Example 1 were performed, yielding the target silane-modified cationized cellulose powder under the conditions shown in Table 2.

Initial stage of primary drying treatment: shovel 120 rpm [clearance: 1.5 to 2 mm], chopper 3,000 rpm.

Latter stage of primary drying treatment through to initial stage of secondary drying treatment (period during which adhesion becomes likely): shovel 50 rpm, chopper 1,000 rpm.

Middle stage to latter stage of secondary drying treatment (period during which adhesion is unlikely): shovel 160 rpm, chopper 500 rpm.

Example 8

With the exceptions of performing a water-miscible organic solvent addition treatment by adding 265 g of 100% isopropyl alcohol to the reaction slurry after addition of the 10% by mass IPA solution of hydrochloric acid but prior to the deliquoring of the silane-modified cationized cellulose slurry, performing the primary drying treatment for 1 hour at a temperature of 90° C. and a degree of vacuum of 26.7 kPa, and performing the secondary drying treatment for 1 hour at a temperature of 125° C. and a degree of vacuum of 1.3 kPa, the same operations as Example 1 were performed, yielding the target silane-modified cationized cellulose.

Example 9 to Example 12

The same operations as those described for Example 1 were performed under the conditions shown in Table 2, yielding a target silane-modified cationized cellulose powder in each case.

Example 13 to Example 15

Following performing cationization in the same manner as that described in Example 1, a 10% by mass IPA solution of hydrochloric acid was added to adjust the pH to 4, yielding a cationized cellulose slurry. To this cationized cellulose slurry was added 250 g of IPA (purity: 99.5%), and the resulting mixture was stirred and mixed for 15 minutes. At this point, the water content within the cationized cellulose slurry was 5%. Subsequently, stirring was stopped, the mixture was left to settle, and 250 g of the supernatant liquid was removed. Subsequently, 2 g (7 parts by mass) of 3-aminopropyltriethoxysilane (KBE-903, manufactured by Shin-Etsu Chemical Co., Ltd., active component: 100%) was added as an aminosilane-based coupling agent, and the resulting mixture was reacted under stirring at 50° C. for 45 minutes. Subsequently, a 10% by mass IPA solution of hydrochloric acid was added to adjust the pH to 6, thus yielding a silane-modified cationized cellulose slurry.

The silane-modified cationized cellulose slurry was deliquored, and the resulting cake (solid fraction: 70%) was subjected to a primary drying treatment for 2 hours at a temperature of 90° C. and a degree of vacuum of 20.0 kPa. A secondary drying treatment was then conducted for 1 hour at a temperature of 125° C. and a degree of vacuum of 1.3 kPa (10 Torr), thereby yielding a silane-modified cationized cellulose powder of Example 13.

Moreover, silane-modified cationized cellulose powders of Example 14 and Example 15 were obtained by conducting the same operations as Example 13 under the conditions shown in Table 3.

Example 16

To 30 g (100 parts by mass) of a guar gum (Meypro Guar CSA200/50, manufactured by Sansho Co., Ltd., viscosity of a 1% by mass aqueous solution (25° C.): at least 5,000 mPa·s) were added 120 g (400 parts by mass) of an 85/15 (mass ratio) mixed solvent of isopropyl alcohol (IPA)/water, and 9.9 g (33 parts by mass) of a 9% by mass aqueous solution of sodium hydroxide, and the resulting mixture was stirred. Subsequently, the temperature was raised to 50° C., 3.7 g (12 parts by mass) of glycidyl trimethylammonium chloride (SY-GTA80, manufactured by Sakamoto Yakuhin Kogyo Co., Ltd., active component: 74% in an aqueous solution) was added as a cationization agent, and the resulting mixture was reacted for 3 hours to effect a cationization. At this time, the pH of the reaction slurry was 12. To the resulting slurry was added 0.6 g (2 parts by mass) of 3-aminopropyltriethoxysilane (KBE-903, manufactured by Shin-Etsu Chemical Co., Ltd., active component: 100%) as an aminosilane-based coupling agent, and treatment was performed by stirring the resulting mixture at 50° C. for 45 minutes. Subsequently, a 10% by mass IPA solution of hydrochloric acid was added to adjust the pH to 6, thus yielding a silane-modified cationized guar gum slurry. The silane-modified cationized guar gum slurry was deliquored, and the resulting cake (solid fraction: 60%) was subjected to a primary drying treatment for 0.5 hours at a temperature of 80° C. and a degree of vacuum of 26.6 kPa. A secondary drying treatment was then conducted for 0.5 hours at a temperature of 140° C. and a degree of vacuum of 1.3 kPa, thereby yielding the target silane-modified cationized guar gum powder.

In those cases where a drying device having no mixing blades is used, such as the evaporator used in Examples 1 to 6 and 9 to 16, adhesion of particles to the drying device becomes more likely, and these adhered particles must be scraped off the device using a spatula or the like, either during or following completion of the drying treatment. In contrast, in the case of a mixing device having mixing blades and choppers such as the Lodige mixer used in Example 8, the mixing blades on the main shaft scrape off any adhered particles, while the choppers crush the adhered particles and any aggregates, meaning operations can be performed continuously with good efficiency. Further, in those cases where a water-miscible organic solvent addition treatment such as that described in Example 8 is performed, the water content within the cake prior to drying can be reduced, meaning adhesion can be suppressed even in those cases where a drying device having no mixing blades such as an evaporator is used, enabling operations to be performed continuously with good efficiency.

Comparative Example 1

With the exception of not performing the primary drying treatment, but rather performing only the secondary drying treatment for 1 hour at a temperature of 110° C. and a degree of vacuum of 1.3 kPa, the same operations as Example 1 were performed, yielding the target silane-modified cationized cellulose powder.

Comparative Example 2, Comparative Example 4

The same operations as those described for Example 13 were performed under the conditions shown in Table 4, yielding a silane-modified cationized cellulose slurry, and subsequently, either the primary drying treatment was excluded with only the secondary drying treatment being performed in Comparative Example 2, or only the primary drying treatment was performed in Comparative Example 4, under the respective drying conditions shown in Table 4.

Comparative Example 3, Comparative Example 5, Comparative Example 6

With the exceptions of not performing the primary drying treatment, and performing the secondary drying treatment under the conditions shown in Table 4, the same operations as Example 1 were performed, yielding the target silane-modified cationized cellulose powder in each case.

The silane-modified cationized cellulose powders obtained in the examples and comparative examples described above were analyzed and evaluated using the methods described below. The results are shown in Tables 1 to 4.

[Analysis Methods]

Using the procedure described below, the amount of adsorption of the aminosilane compound (hereinafter frequently referred to as the "SC agent") to the cationized cellulose was determined The same determination was performed for the cationized guar gum.

[1] ICP Analysis

Each sample (silane-modified cationized cellulose powder) was diluted approximately 3,000-fold in distilled water to prepare an analysis sample.

Each of these analysis samples was subjected to an ICP emission analysis under the analysis conditions described below.

(ICP Analysis Conditions)

Apparatus: PerkinElmer Optima 5300DV, RF output: 1,300 W, Ar gas flow rate/plasma: 15 L/min., auxiliary: 0.2 L/min., carrier: 0.7 L/min., pump flow rate: 1.0 ml/min., measurement wavelength: 251.611 nm, number of measurements: 3.

[2] Calibration Curve Preparation 3-aminopropyltriethoxysilane (KBE-903) was diluted with distilled water to prepare solutions of 0.1 ppm, 1 ppm, 5 ppm, 10 ppm and 50 ppm as calibration curve samples.

An ICP emission analysis was performed for each of these calibration curve samples under the same analysis conditions as those described in [1] above. A calibration curve was then created by plotting the emission intensity from the analysis results on the y axis, and the SC agent concentration (0.1 ppm, 1 ppm, 5 ppm, 10 ppm and 50 ppm) along the x-axis. A straight line approximation of the calibration curve was also determined at the same time. The gradient of this approximated straight line was termed p, and the intercept was termed q.

[3] Calculation of Amount of SC Agent Adsorption (%) within Sample

Based on the results from [1] and [2] above, the numerical formula shown below was used to calculate the amount of SC agent adsorption (%) within each sample (silane-modified cationized cellulose powder).

Amount of $SC$ agent adsorption (%)=[(Emission intensity of analysis sample)$-q$]/$p$×(sample dilution ratio)×10,000     [Numerical formula 3]

[Evaluation Methods]

Each of the silane-modified cationized celluloses and the silane-modified cationized guar gum obtained in the above examples and comparative examples was sieved through a mesh to isolate the fraction having a particle size of not more than 850 µm, and this fraction was used as a sample powder in the evaluations described below.

[Water Dispersibility]

A 100 mL beaker was charged with 50 g of distilled water, and 0.5 g of the sample powder was dropped into the water from a height 4 cm above the water surface. The time taken from completion of the addition of the sample powder until the sample powder had completely dispersed in the water with no powder remaining on the water surface was measured, and this time was recorded as the "dispersion time". Based on this dispersion time, the water dispersibility was evaluated against the criteria shown below.

(Evaluation Criteria)

OO: 30 seconds or less

O: more than 30 seconds, but not more than 60 seconds

Δ: more than 60 seconds, but not more than 300 seconds

×: more than 300 seconds

[Amount of Residual Isopropanol (IPA)]

Analysis was performed using the same method as that described above for measuring the amount of residual isopropanol (IPA) at the completion of the primary drying treatment.

Based on the amount of IPA, the amount of residual IPA was evaluated against the criteria shown below.

(Evaluation Criteria)
O: less than 0.10%
Δ: at least 0.10%, but less than 1.0%
×: 1.0% or more The pH at the time of SC agent treatment, the amount added of the SC agent (% relative to the HEC or guar gum), and the results of the analyses and evaluations described above for each of the examples and comparative examples are shown below in Tables 1 to 4. The amount added of the SC agent (% relative to the HEC) represents the ratio (%) of the amount added (parts by mass) of the SC agent relative to the amount used (parts by mass) of the raw material hydroxyethyl cellulose. A similar ratio was determined for the guar gum.

As is clearly evident from these results, the silane-modified cationized celluloses obtained in Examples 1 to 8 each exhibited excellent water dispersibility. Further, the silane-modified cationized cellulose obtained in Example 9 also exhibited favorable water dispersibility, despite using only a very small amount of the SC agent. Moreover, the products of the examples in which a primary drying treatment and a secondary drying treatment were performed all had small amounts of residual IPA.

TABLE 1

| | | | Example | | | | | |
|---|---|---|---|---|---|---|---|---|
| | | | 1 | 2 | 3 | 4 | 5 | 6 |
| Treatment | pH at SC agent treatment | | 12 | 12 | 12 | 13 | 11 | 10 |
| | Amount of added SC agent (% relative to HEC) | | 2 | 0.5 | 10 | 2 | 2 | 2 |
| | IPA/water ratio within solvent | | 85/15 | 85/15 | 85/15 | 85/15 | 85/15 | 85/15 |
| Drying conditions | Primary drying | Temperature (° C.) | 80 | 80 | 80 | 100 | 80 | 80 |
| | | Degree of vacuum (kPa) | 20.0 | 20.0 | 20.0 | 33.3 | 20.0 | 20.0 |
| | | Drying time (hours) | 1 | 1 | 1 | 1 | 1 | 1 |
| | Secondary drying | Temperature (° C.) | 110 | 110 | 110 | 140 | 110 | 110 |
| | | Degree of vacuum (kPa) | 1.3 | 1.3 | 1.3 | 12.0 | 1.3 | 1.3 |
| | | Drying time (hours) | 1 | 1 | 1 | 1 | 1 | 1 |
| Amount of residual IPA at completion of primary drying (%) | | | N.D. | N.D. | N.D. | N.D. | N.D. | N.D. |
| Loss on drying at completion of primary drying (%) | | | 18.4 | 20.0 | 18.0 | 20.1 | 15.0 | 20.5 |
| Loss on drying at completion of secondary drying (%) | | | 0.9 | 1.0 | 1.1 | 0.5 | 0.8 | 1.0 |
| Amount of SC agent adsorption (%) | | | 1.4 | 0.3 | 6.2 | 1.4 | 1.2 | 1.0 |
| Evaluations | Water dispersibility | | OO | OO | OO | OO | OO | OO |
| | Amount of residual IPA (%) | | N.D. | N.D. | N.D. | N.D. | N.D. | N.D. |
| | Amount of residual IPA evaluation | | O | O | O | O | O | O |

TABLE 2

| | | | Example | | | | | |
|---|---|---|---|---|---|---|---|---|
| | | | 7 | 8 | 9 | 10 | 11 | 12 |
| Treatment | pH at SC agent treatment | | 12 | 12 | 13 | 11 | 12 | 12 |
| | Amount of added SC agent (% relative to HEC) | | 2 | 2 | 0.1 | 3 | 3 | 3 |
| | IPA/water ratio within solvent | | 85/15 | 85/15 | 85/15 | 85/15 | 85/15 | 85/15 |
| Drying conditions | Primary drying | Temperature (° C.) | 80 | 90 | 80 | 80 | 100 | 120 |
| | | Degree of vacuum (kPa) | 20.0 | 26.7 | 20.0 | 26.7 | 26.7 | 26.7 |
| | | Drying time (hours) | 1.5 | 1 | 1 | 1.5 | 1.5 | 1.5 |
| | Secondary drying | Temperature (° C.) | 110 | 125 | 110 | 120 | 120 | 120 |
| | | Degree of vacuum (kPa) | 1.3 | 1.3 | 1.3 | 0.1 | 0.1 | 0.1 |
| | | Drying time (hours) | 2 | 1 | 1 | 1.5 | 1.5 | 1.5 |
| Amount of residual IPA at completion of primary drying (%) | | | N.D. | N.D. | N.D. | N.D. | 0.06 | 0.06 |
| Loss on drying at completion of primary drying (%) | | | 19.8 | 19.5 | 17.5 | 19.8 | 19.8 | 19.8 |
| Loss on drying at completion of secondary drying (%) | | | 0.9 | 0.5 | 0.9 | 0.8 | 0.6 | 0.5 |
| Amount of SC agent adsorption (%) | | | 1.4 | 1.4 | 0.05 | 1.8 | 1.8 | 1.9 |
| Evaluations | Water dispersibility | | OO | OO | O | OO | OO | OO |
| | Amount of residual IPA (%) | | N.D. | N.D. | N.D. | N.D. | N.D. | N.D. |
| | Amount of residual IPA evaluation | | O | O | O | O | O | O |

TABLE 3

| | | | Example | | | |
|---|---|---|---|---|---|---|
| | | | 13 | 14 | 15 | 16 |
| Treatment | pH at SC agent treatment | | 4 | 4 | 4 | 12 |
| | Amount of added SC agent (% relative to HEC) | | 7 | 9 | 7 | 2 |
| | IPA/water ratio within solvent | | 95/5 | 95/5 | 95/5 | 85/15 |

TABLE 3-continued

|  |  |  | Example | | | |
|---|---|---|---|---|---|---|
|  |  |  | 13 | 14 | 15 | 16 |
| Drying conditions | Primary drying | Temperature (° C.) | 90 | 95 | 120 | 80 |
|  |  | Degree of vacuum (kPa) | 20.0 | 33.3 | 33.3 | 26.6 |
|  |  | Drying time (hours) | 2 | 2 | 2 | 0.5 |
|  | Secondary drying | Temperature (° C.) | 125 | 125 | 145 | 140 |
|  |  | Degree of vacuum (kPa) | 1.3 | 1.3 | 1.3 | 1.3 |
|  |  | Drying time (hours) | 1 | 1 | 1 | 0.5 |
| Amount of residual IPA at completion of primary drying (%) |  |  | 0.10 | 0.06 | 0.07 | N.D. |
| Loss on drying at completion of primary drying (%) |  |  | 5.7 | 6.9 | 1.1 | 17.8 |
| Loss on drying at completion of secondary drying (%) |  |  | 0.0 | 0.0 | 0.0 | 0.6 |
| Amount of SC agent adsorption (%) |  |  | 1.1 | 1.4 | 1.2 | 1.1 |
| Evaluations | Water dispersibility |  | OO | OO | OO | OO |
|  | Amount of residual IPA (%) |  | 0.04 | 0.06 | 0.05 | N.D. |
|  | Amount of residual IPA evaluation |  | O | O | O | O |

TABLE 4

|  |  |  | Comparative Example | | | | | |
|---|---|---|---|---|---|---|---|---|
|  |  |  | 1 | 2 | 3 | 4 | 5 | 6 |
| Treatment | pH at SC agent treatment | | 12 | 7 | 12 | 4 | 12 | 12 |
|  | Amount of added SC agent (% relative to HEC) | | 2 | 2 | 3 | 7 | 3 | 3 |
|  | IPA/water ratio within solvent | | 85/15 | 95/5 | 85/15 | 95/5 | 85/15 | 85/15 |
| Drying conditions | Primary drying | Temperature (° C.) | — | — | — | 90 | — | — |
|  |  | Degree of vacuum (kPa) | — | — | — | 20.0 | — | — |
|  |  | Drying time (hours) | — | — | — | 5 | — | — |
|  | Secondary drying | Temperature (° C.) | 110 | 120 | 120 | — | 80 | 120 |
|  |  | Degree of vacuum (kPa) | 1.3 | 0.1 | 2.5 | — | 0.1 | 0.1 |
|  |  | Drying time (hours) | 1 | 3 | 2 | — | 1.5 | 1.5 |
| Amount of residual IPA at completion of primary drying (%) | | | — | — | — | 0.10 | — | — |
| Loss on drying at completion of primary drying (%) | | | — | — | — | 1.8 | — | — |
| Loss on drying at completion of secondary drying (%) | | | 1.0 | 1.5 | 1.2 | — | 5.1 | 2.1 |
| Amount of SC agent adsorption (%) | | | 1.4 | 0.6 | 1.9 | 1.1 | 2.0 | 1.9 |
| Evaluations | Water dispersibility | | OO | OO | OO | x | — | — |
|  | Amount of residual IPA (%) | | 1.70 | 1.10 | 0.61 | 0.10 | 4.85 | 1.55 |
|  | Amount of residual IPA evaluation | | x | x | Δ | Δ | x | x |

INDUSTRIAL APPLICABILITY

A silane-modified cationized polymeric compound having excellent water dispersibility can be produced with good efficiency.

We claim:

1. A process for producing a silane-modified cationized polymeric compound, the process comprising:
    a step (1) of cationizing a water-soluble cellulose ether, in a mixed solvent of a water-miscible organic solvent and water, and in presence of an alkali, thus forming a slurry containing a cationized polymeric compound,
    a step (2) of adding an aminosilane compound to the slurry or a cake produced therefrom, thus treating the cationized polymeric compound with the aminosilane compound,
    an optional step (3) of adding an acid to the slurry obtained in the step (1) or a product obtained in the step (2), and
    a step (4) of drying a product obtained in the step (2) or a product obtained by performing the step (3) after the step (2), wherein
    the drying of the step (4) comprises:
        a primary drying treatment step of performing drying at a temperature of 50 to 140° C. under a degree of vacuum of 13.3 to 53.3 kPa, and
        a secondary drying treatment step of drying a product following the primary drying treatment at a temperature of 90 to 155° C. under a degree of vacuum of not more than 6.7 kPa.

2. The process for producing a silane-modified cationized polymeric compound according to claim 1, wherein an amount added of the aminosilane compound during the step (2) is within a range from 0.05 to 20% by mass relative to an amount of the water-soluble cellulose ether, and a treatment of the cationized polymeric compound with the aminosilane compound is performed under alkaline conditions with a pH of 10 or greater.

3. A process for producing a silane-modified cationized polymeric compound, the process comprising:
    a step (1) of cationizing a water-soluble cellulose ether, in a mixed solvent of a water-miscible organic solvent and water, and in presence of an alkali, thus forming a slurry containing a cationized polymeric compound,
    a step (2) of adding an aminosilane compound to the slurry or a cake produced therefrom, thus treating the cationized polymeric compound with the aminosilane compound, and
    a step (4) of drying a product obtained in the step (2), wherein
    an amount added of the aminosilane compound during the step (2) is within a range from 0.05 to 20% by mass relative to an amount of the water-soluble cellulose ether, treatment of the cationized polymeric compound with the aminosilane compound is performed under alkaline conditions with a pH of 10 or greater, and the step (4) comprises:

performing a primary drying treatment of the product at a temperature of 50 to 120° C. under a degree of vacuum of 13.4 to 53.3 kPa, and performing a secondary drying treatment of the product following the primary drying treatment at a temperature of 90 to 150° C. under a degree of vacuum of not more than 13.3 kPa.

4. The process for producing a silane-modified cationized polymeric compound according to claim 3, further comprising a step (3) of adding an acid to a product obtained in the step (2).

5. The process for producing a silane-modified cationized polymeric compound according to any one of claims 1, 2, 3 and 4, wherein the primary drying treatment step is performed until an amount of residual organic solvent is 0.20% by mass or less.

6. The process for producing a silane-modified cationized polymeric compound according to any one of claims 1, 2, 3 and 4, wherein the secondary drying treatment step is performed until loss on drying is 2% by mass or less.

7. The process for producing a silane-modified cationized polymeric compound according to any one of claims 1, 2, 3 and 4, wherein the cationized polymeric compound is a cationized cellulose.

* * * * *